(12) United States Patent
Liu et al.

(10) Patent No.: US 10,270,952 B2
(45) Date of Patent: Apr. 23, 2019

(54) IMAGING MODULE WITH TWO CAMERAS AND ELECTRONIC DEVICE

(71) Applicant: Guangdong Oppo Mobile Telecommunications Corp., Ltd., Dongguan, Guangdong (CN)

(72) Inventors: Yougen Liu, Guangdong (CN); Ke Ran, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/826,937

(22) Filed: Nov. 30, 2017

(65) Prior Publication Data
US 2018/0167540 A1 Jun. 14, 2018

(30) Foreign Application Priority Data
Dec. 8, 2016 (CN) .......................... 2016 1 1121719

(51) Int. Cl.
*H04N 5/225* (2006.01)
*H04N 5/247* (2006.01)
*H04M 1/02* (2006.01)

(52) U.S. Cl.
CPC ........ *H04N 5/2257* (2013.01); *H04M 1/0277* (2013.01); *H04N 5/2253* (2013.01); *H04N 5/2254* (2013.01); *H04N 5/2258* (2013.01); *H04N 5/247* (2013.01); *H04M 1/0264* (2013.01)

(58) Field of Classification Search
CPC .. H04N 5/2257; H04N 5/2253; H04N 5/2254; H04N 5/2258; H04N 5/247; H04M 1/0277; H04M 1/0264
See application file for complete search history.

(56) References Cited

U.S. PATENT DOCUMENTS 9,474,154 B2* 10/2016 Johansson .............. H05K 3/363
9,800,768 B2* 10/2017 Bae ...................... H04N 5/2257
9,826,132 B2* 11/2017 Wang .................... G02B 3/0075
10,178,285 B2* 1/2019 Chen .................... H04N 5/2258
(Continued)

FOREIGN PATENT DOCUMENTS

CN         1667911 A       9/2005
CN       101345780 A       1/2009
(Continued)

OTHER PUBLICATIONS

Extended European Search Report issued in corresponding European application No. 17201256.9 dated Jan. 3, 2018.
(Continued)

*Primary Examiner* — Antoinette T Spinks
(74) *Attorney, Agent, or Firm* — Young Basile Hanlon & MacFarlane, P.C.

(57) ABSTRACT

An imaging module and an electronic device including the imaging module are provided. The imaging module includes a flexible printed circuit board and an imaging unit including two cameras arranged side by side and connected to the flexible printed circuit board. The flexible printed circuit board includes a projection portion projecting to a side edge of the imaging unit. The side edge extends along an arranging direction of the two cameras, and a width of the projection portion in the arranging direction is less than a length of the side edge.

20 Claims, 6 Drawing Sheets

(56) References Cited

U.S. PATENT DOCUMENTS

| | | | | |
|---|---|---|---|---|
| 2009/0017867 A1* | 1/2009 | Koh | ................... | H04M 1/0264 |
| | | | | 455/556.1 |
| 2010/0090647 A1 | 4/2010 | Umetsu et al. | | |
| 2013/0148950 A1* | 6/2013 | Chang | ................... | G03B 35/08 |
| | | | | 396/326 |
| 2014/0212127 A1* | 7/2014 | Chen | ................... | H04N 5/2257 |
| | | | | 396/542 |
| 2017/0223237 A1* | 8/2017 | Hu | ................ | H04N 5/2252 |
| 2017/0353634 A1* | 12/2017 | Kim | ................ | G02B 5/005 |

FOREIGN PATENT DOCUMENTS

| | | | |
|---|---|---|---|
| CN | 103762702 A | | 4/2014 |
| CN | 104993562 A | | 10/2015 |
| CN | 105187697 A | | 12/2015 |
| CN | 105681637 A | | 6/2016 |
| CN | 205545547 U | * | 8/2016 |
| CN | 205545547 U | | 8/2016 |
| CN | 205545553 U | | 8/2016 |
| KR | 100649770 B1 | | 11/2006 |

OTHER PUBLICATIONS

International Search Report issued in corresponding international application No. PCT/CN2017/111804 dated Feb. 8, 2018.

\* cited by examiner

IMAGING MODULE WITH TWO CAMERAS AND ELECTRONIC DEVICE

CROSS-REFERENCE TO RELATED APPLICATION

The present application claims priority to Chinese Patent Application No. 201611121719.6 filed on Dec. 8, 2016, the content of which is hereby incorporated by reference in its entirety.

TECHNICAL FIELD

The present disclosure relates to electronic equipment, and more particularly, to an imaging module and an electronic device including the imaging module.

BACKGROUND

A dual-camera module includes two cameras arranged side by side, and accordingly, two flexible printed circuit boards are also arranged side by side so as to transmit data, respectively. However, when the dual-camera module is arranged in an electronic device such as a mobile phone or a tablet computer, the two flexible printed circuit boards cover a large area and thus significantly affect electrical performance of electronic elements in the electronic device, which is not beneficial for arranging the electronic elements.

BRIEF DESCRIPTION OF THE DRAWINGS

The foregoing and/or additional aspects and advantages of the present disclosure will become apparent and better understood from the following description of the implementations taken in conjunction with the accompanying drawings.

DETAILED DESCRIPTION

Detailed implementations of the present disclosure are disclosed herein, and examples in the implementations are shown in the drawings in which identical or similar reference numbers and/or letters represent identical or similar parts or parts having identical or similar functions throughout. The implementations described with reference to the drawings below are merely exemplary for the purpose of explaining the present disclosure, and are not intended to limit the present disclosure.

In the description of the present disclosure, it should be understood that orientational or positional relationships indicated by the terms "central", "longitudinal", "transverse", "length", "width", "thickness", "upper", "lower", "front", "back", "left", "right", "vertical", "horizontal", "top", "bottom", "inside", "outside", "clockwise", "counterclockwise", and the like are those as illustrated in the accompanying drawings, and are merely for facilitating and simplifying the description of the present disclosure, rather than indicating or implying that the mentioned devices or elements should have specific orientations and should be constructed and operated in specific orientations, and thus cannot be construed as a limit to the present disclosure.

In addition, the terms "first", "second" are merely for illustrative purposes, and cannot be construed as indicating or implying relative importance or implicitly indicating the quantity of mentioned technical features. Therefore, explicitly or implicitly, features defined by "first", "second" may be one or more. In the description of the present disclosure, the term "plural" means two or more, unless specified otherwise.

In the present disclosure, unless specified otherwise, the terms "mount", "connect", "couple", and the like should be broadly understood, and may include, for example, an undetachable connection, a detachable connection, an integral connection, a mechanical connection, an electrical connection, a direct connection, an indirect connection via an intermediate medium, a communication between two elements, and an interaction relationship between two elements. For persons skilled in the art, the specific meaning of the foregoing terms in the present disclosure should be understood in light of the specific circumstance.

In the present disclosure, unless specified otherwise, the first feature being "on" or "beneath" the second feature may mean that the first feature may be in direct contact with the second feature, or the first feature may be in indirect contact with the second feature via an intermediate medium. Moreover, the first feature being "on", "over" or "above" the second feature may mean that the first feature is over or above the second feature, or merely mean that the first feature has a horizontal level higher than the second feature. The first feature being "beneath", "under" or "below" the second feature may mean that the first feature is under or below the second feature, or merely mean that the first feature has a horizontal level lower than the second feature.

Many different implementations or examples for achieving different structures of the present disclosure are provided hereinafter. To simplify the present disclosure, the components and arrangements of specific examples are described below. These components and arrangements are merely exemplary, and are not to be construed as a limit to the present disclosure. In addition, the reference numbers and/or letters may be repeated in the different examples of the present disclosure. Such repetition is for the purpose of simplification and clarity, without indicating relationships between the discussed various implementations and/or arrangements. Moreover, the present disclosure provides examples of various specific processes and materials, but the application of other processes and/or other materials may also be appreciated by persons skilled in the art.

Figure 1:
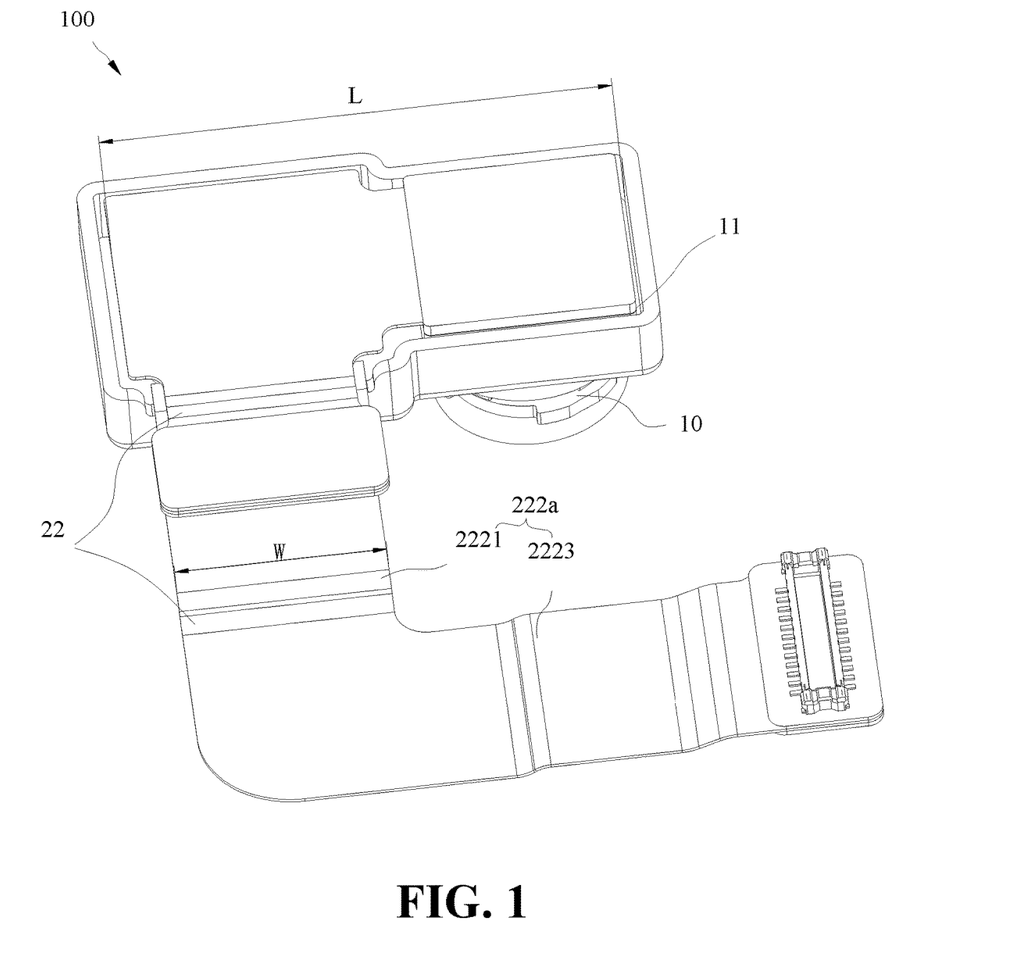
FIG. 1 is a schematic isometric view of an imaging module according to an implementation of the present disclosure.

FIG. 1 is a schematic isometric view of an imaging module according to an implementation of the present disclosure. As illustrated in FIG. 1, an imaging module 100 includes an imaging unit 11 and a flexible printed circuit board 20. The imaging unit 11 includes two cameras 10 which are arranged side by side and connected to the flexible printed circuit board 20. The two cameras 10 can operate cooperatively or independently of each other. The flexible printed circuit board 20 includes a projection portion 22 projecting to a side edge of the imaging unit 11. The side edge extends along an arranging direction of the two cameras 10. In one implementation, as illustrated in FIG. 1, the projection portion 22 projects along a direction perpendicular to the arranging direction. The projection portion 22 has a width W in the arranging direction which is less than a length L of the side edge in the arranging direction. The ratio of the width W of the projection portion 22 to the length L of the side edge of the imaging unit 11 ranges from ⅓ to ⅔ (⅓<W/L<⅔).

In the imaging module 100 according to the implementation of the present disclosure, since the ratio of the width W of the projection portion 22 to the length L of the side edge ranges from ⅓ to ⅔, the flexible printed circuit board 20 covers a small area, which is beneficial for arranging electronic elements in the electronic device.

The electronic elements may be, for example, ports which are located in the electronic device and configured for transmitting and receiving wireless signals. Since the width W of the projection portion 22 of the flexible printed circuit board 20 is small, the ports configured for transmitting and receiving wireless signals can be exposed so as to enable transmission and reception of the wireless signals and ensure normal operation of the electronic device.

In at least one implementation, the length of the side edge of the imaging unit 11 is sufficiently large, and the projection portion 22 projects to the side edge of the imaging unit 11 to be capable of ensuring that the flexible printed circuit board 20 has a sufficient width, thereby meeting requirements of arranging wires on the flexible printed circuit board 20 and in turn ensuring shooting function of the imaging module 100.

In one implementation, the ratio of the width W of the projection portion 22 to the length L of the side edge of the imaging unit 11 ranges from ⅓ to ½. As a result, the area covered by the projection portion 22 is smaller, and the electrical performance of the electronic elements near the flexible printed circuit board 20 can be ensured.

In one implementation, the length L of the side edge of the imaging unit 11 is 8 to 12 mm, and the width W of the projection portion 22 is 4 to 6 mm. For example, the length L of the side edge of the imaging unit 11 is 10 mm, and the width W of the projection portion 22 is 5 mm. In other words, the ratio of the width W of the projection portion 22 to the length L of the side edge of the imaging unit 11 is ½ (W/L=½).

In one implementation, as illustrated in FIG. 1, the projection portion 22 is merely located on one side of one camera 10. In other words, the position of the projection portion 22 corresponds to one of the cameras 10, and thus the flexible printed circuit board 20 is not adjacent to the other camera 10, such that the electronic elements near the other camera 10 are not covered by the flexible printed circuit board 20, thereby enabling the electronic elements functioning properly. In this case, the width of the projection portion may be no greater than a length of the one camera 10 in the arranging direction of the two cameras 10.

Figure 2:
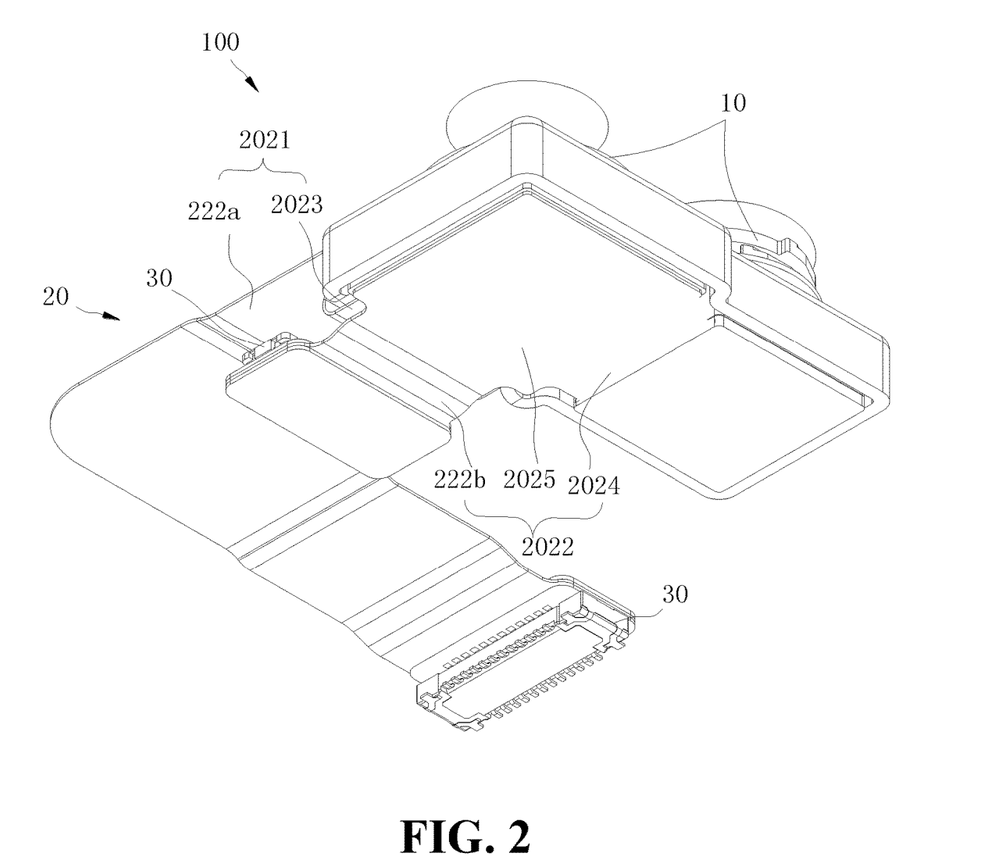
FIG. 2 is a schematic isometric view of the imaging module of FIG. 1 from another viewing direction.
Figure 3:
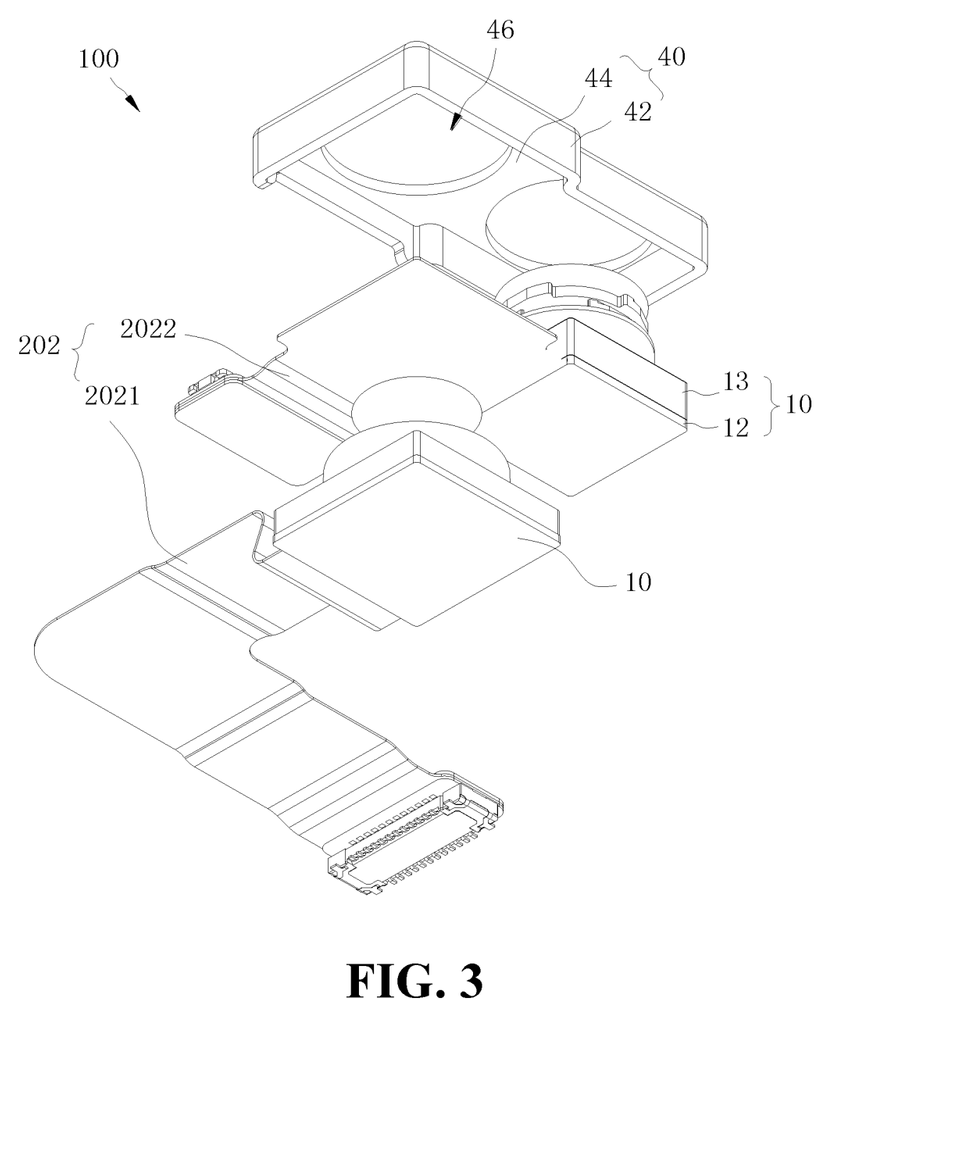
FIG. 3 is an exploded isometric view of the imaging module of FIG. 1.

FIG. 2 is a schematic isometric view of the imaging module of FIG. 1 from another viewing direction. FIG. 3 is an exploded isometric view of the imaging module of FIG. 1. As illustrated in FIG. 2 and FIG. 3, in one implementation, each of the two cameras 10 includes a printed circuit board 12, an image sensor (not shown), and a lens assembly 13. The image sensor is disposed on the printed circuit board 12. The lens assembly 13 is located above the image sensor. The two printed circuit boards 12 are spaced apart. The flexible printed circuit board 20 is coupled to the printed circuit boards 12.

The two printed circuit boards 12 are spaced apart such that the two cameras 10 are spaced apart, which is beneficial for adjusting the optical axes of the two cameras 10 in parallel. In one implementation, when the two cameras 10 are assembled, one of the cameras 10 can be firstly held by a robot, then the position of the other camera 10 is adjusted by another robot until the optical axes of the two cameras 10 are parallel to each other and the two cameras 10 are identically oriented, and finally the two cameras 10 are secured by means of welding or dispensing.

The image sensor is, for example, a complementary metal oxide semiconductor (CMOS) image sensor or a charge-coupled device (CCD) image sensor. The image sensor can capture an image of the object, convert it into electrical signals, and transmit the signals to an external module via the printed circuit board 12 and the flexible printed circuit board 20. It should be noted that, the sensing surfaces of the two image sensors are identically oriented.

Each of the lens assemblies 13 may include a voice coil motor and a lens disposed in the voice coil motor. The voice coil motor can drive the lens to move along the optical axis direction of the lens, so as to adjust a distance between the lens and the image sensor and in turn achieve auto-focus of the imaging module 100, thereby enabling the imaging module 100 to shoot images of fine quality.

In one implementation, the lenses of the lens assemblies 13 of the two cameras 10 are a wide-angle lens and a telephoto lens, respectively. It will be appreciated that the wide-angle lens has a large shooting angle, while the telephoto lens has a small depth of field. The imaging module 100 can achieve optical zoom function by combining the wide-angle lens and the telephoto lens, thereby enabling the electronic device having the imaging module 100 to shoot images of high quality.

As illustrated in FIG. 2 and FIG. 3, in one implementation, the flexible printed circuit board 20 includes two flexible printed circuit sub-boards 202, and accordingly, the projection portion 22 includes two projection sub-portions 222 included by the two flexible printed circuit sub-boards 202, respectively.

The two flexible printed circuit sub-boards 202 are coupled to the printed circuit boards 12, respectively, and the two projection sub-portions 222 are arranged to be stacked.

In this way, the two flexible printed circuit sub-boards 202 are connected to the two cameras 10, respectively, thereby facilitating controlling the shooting by each camera 10 and in turn enabling the imaging module 100 to shoot images of fine quality.

In one implementation, the two flexible printed circuit sub-boards 202 are a first flexible printed circuit sub-board 2021 and a second flexible printed circuit sub-board 2022. As illustrated in FIG. 2, the first flexible printed circuit sub-board 2021 includes a first connection portion 2023 coupled to the printed circuit board 12 of the one camera 10 and a first projection sub-portion 222a projecting from the first connection portion 2023 and beyond the side edge of the imaging unit 11.

The second flexible printed circuit sub-board 2022 includes a second connection portion 2024 coupled to the printed circuit board 12 of the other camera 10, an extension portion 2025, and a second projection sub-portion 222b. The extension portion 2025 extends from the second connection portion 2024 towards the first connection portion 2023, and in turn, covers the first connection portion 2023. The second projection sub-portion 222b projects from the extension portion 2025 and beyond the side edge of the imaging unit 11. The first projection sub-portion 222a and the second projection sub-portion 222b are arranged to be stacked.

As illustrated in FIG. 2, the first flexible printed circuit sub-board 2021 is connected to the camera 10 on the left, while the second flexible printed circuit sub-board 2022 is connected to the camera 10 on the right. Naturally, in other implementations, the first flexible printed circuit sub-board 2021 may be connected to the camera 10 on the right, while the second flexible printed circuit sub-board 2022 may be connected to the camera 10 on the left.

In one implementation, as illustrated in FIG. 1, the first projection sub-portion 222a includes a first projection section 2221 and a second projection section 2223. The first projection section 2221 projects to the one camera 10, and the second projection section 2223 is connected to one end of the first projection section 2221 away from the one camera 10 and projects along the arranging direction of the two cameras 10. The second projection sub-portion 222b has a length smaller than the first projection section 2221.

Naturally, in other implementations, the second projection section 2223 may be removed, and in this case, the first projection sub-portion 222a may have a length less than or equal to the second projection sub-portion 222b.

In one implementation, as illustrated in FIG. 2, the imaging module 100 further includes two connectors 30. One connector 30 is provided on a first surface of the first projection sub-portion 222a, while the other connector 30 is provided on a second surface of the second projection sub-portion 222b. The second surface is opposite the first surface. The connectors 30 are configured for being connected to external circuits.

As such, the imaging module 100 can be quickly mounted in the electronic device by means of the connectors 30 disposed on the two opposite surfaces of the first projection sub-portion 222a and the second projection sub-portion 222b, thereby facilitating mounting the imaging module 100 onto two opposite sides of a circuit board.

In one implementation, the imaging module 100 further includes a housing 40 (e.g., a cuboid housing). The two cameras 10 are disposed in the housing 40 and undetachably connected to the housing 40.

The housing 40 can improve the stability of the two cameras 10 and prevent the optical axes of the two cameras 10 from being misaligned to affect imaging quality of the imaging module 100 when the imaging module 100 is impacted.

In one implementation, the housing 40 includes a frame 42 and a cover plate 44. As illustrated in FIG. 3, the frame 42 surrounds the two cameras 10, and the cover plate 44 is connected to the top of the frame 42. The cover plate 44 is provided with a through hole 46 through which the two cameras 10 are exposed so as to be capable of shooting. The two cameras 10 may be undetachably connected to the housing 40 by means of welding or dispensing.

In order to ensure the strength of the connection between the housing 40 and the two cameras 10, the housing 40 is formed by stamping a stainless steel plate having a thickness greater than or equal to 0.5 mm. For example, the thickness of the housing 40 is 0.6 mm, 0.8 mm, or the like.

Figure 4:
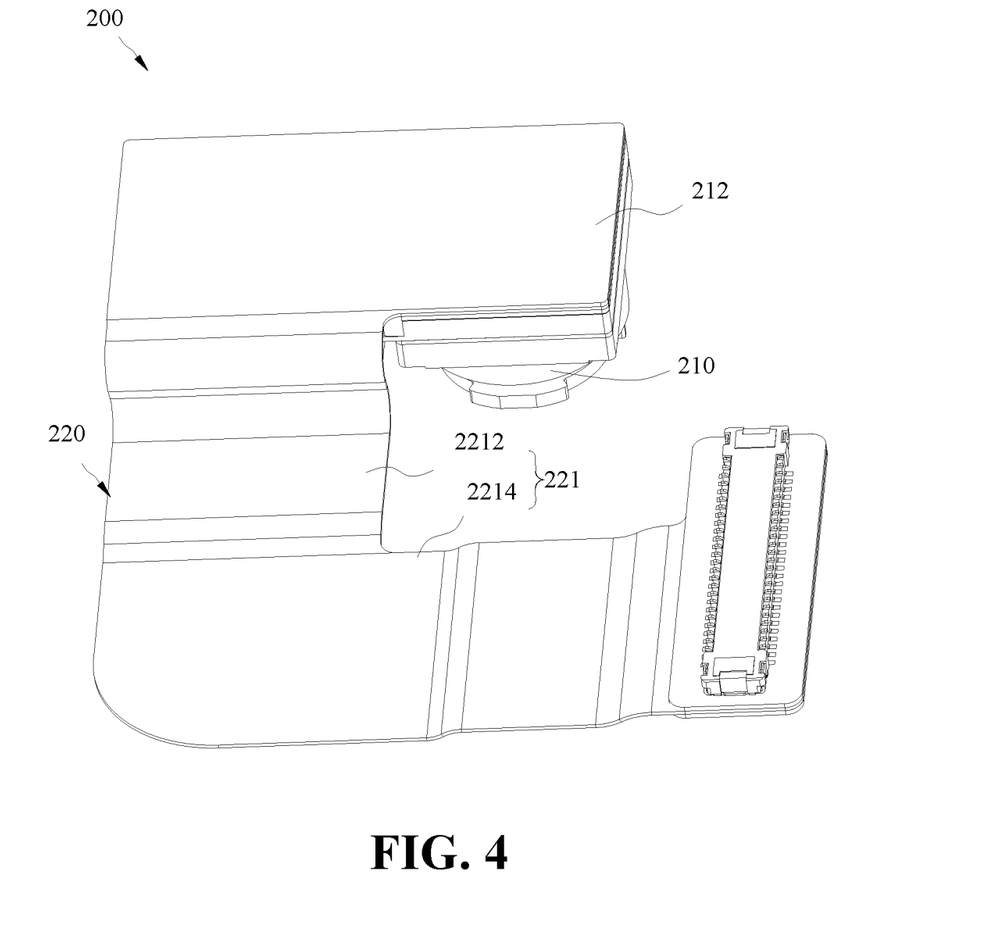
FIG. 4 is a schematic isometric view of an imaging module according to another implementation of the present disclosure.

FIG. 4 is a schematic isometric view of an imaging module according to another implementation of the present disclosure. As illustrated in FIG. 4, an imaging module 200 is the same as the imaging module 100, except that two image sensors are disposed on a printed circuit board 212 (e.g., a single continuous printed circuit board) and a printed circuit board 220 (e.g., a single continuous flexible printed circuit board) is coupled to the printed circuit board 212. In other words, two cameras 210 share the printed circuit board 212, and the number of the flexible printed circuit board 220 is only one.

In this way, the number of components of the imaging module 200 is reduced, thereby simplifying processes for manufacturing the imaging module 200 and improving efficiency of manufacturing the imaging module 200.

In one implementation, the flexible printed circuit board 220 includes a projection portion 221 projecting from a side edge of the printed circuit board 212. The projection portion 221 includes a first elongation portion 2212 coupled to the printed circuit board 212 and a second elongation portion 2214. As illustrated in FIG. 4, the second elongation portion 2214 elongates along the arranging direction of the two cameras 210 from one end of the first elongation portion 2212 away from the printed circuit board 212.

Naturally, in other implementations, the second elongation portion 2214 may be removed.

In one implementation, the flexible printed circuit board 220 is a four-layered board. In other words, the flexible printed circuit board 220 has four layers, thereby meeting requirements of wires of the imaging module 200.

It is to be noted that, the description of the imaging module 100 is also applicable to the imaging module 200. Aspects of the imaging module 200 not described may be identical or similar to those of the imaging module 100, and are not repeated herein.

Figure 5:
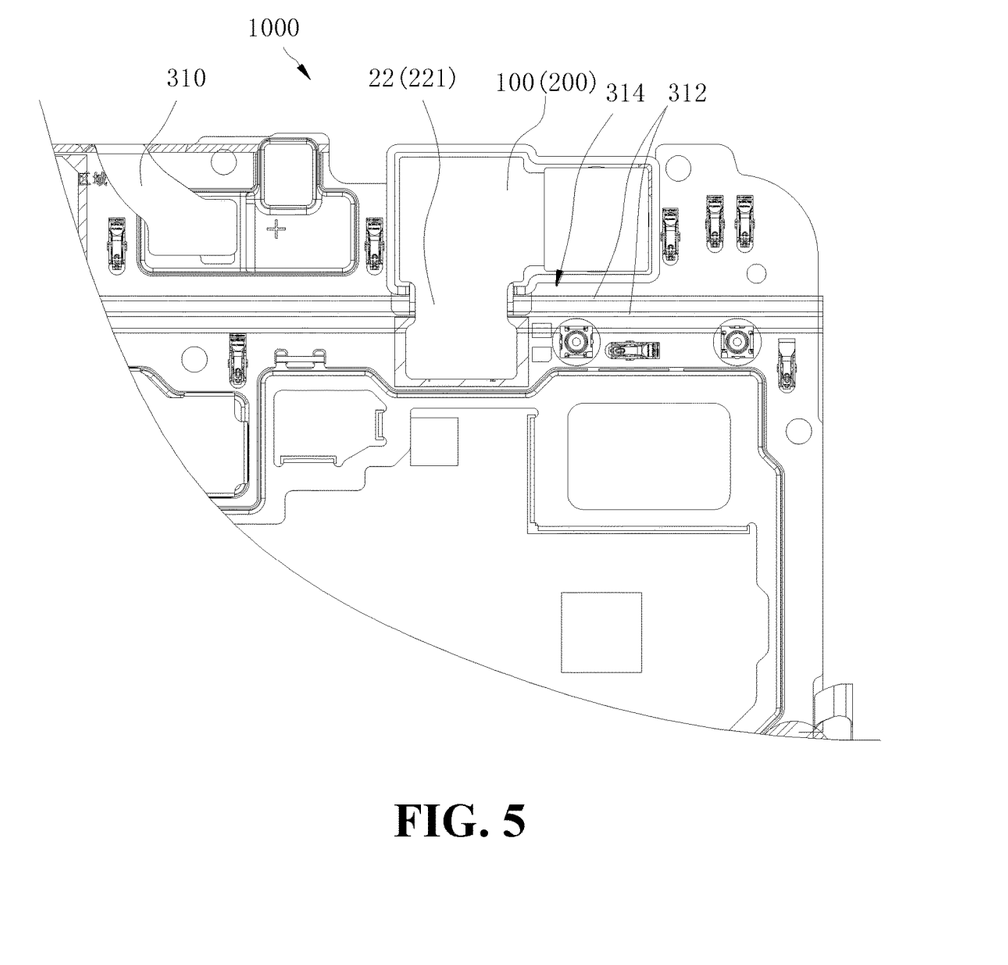
FIG. 5 is a schematic structural view of an electronic device according to an implementation of the present disclosure.
Figure 6:
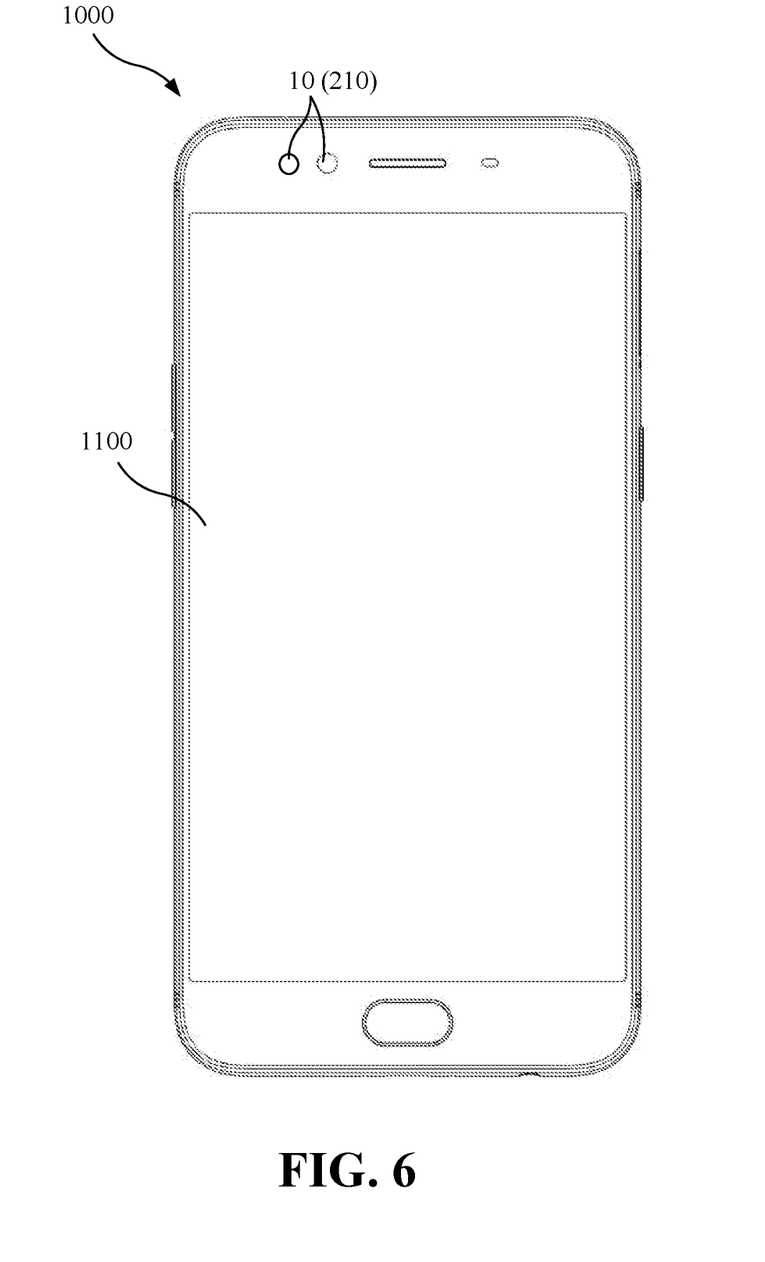
FIG. 6 is a schematic plan view of an electronic device according to an implementation of the present disclosure.

FIG. 5 is a schematic structural view of an electronic device according to an implementation of the present disclosure. FIG. 6 is a schematic plan view of the electronic device. As illustrated in FIG. 5, an electronic device 1000 includes a main circuit board 310 and an imaging module 100(200) according to any one of the foregoing implementations. The electronic device 1000 is, for example, a mobile phone or a tablet computer. The main circuit board 310 is provided with an antenna area 314. The flexible printed circuit board 20(220) does not overlap the antenna area 314, and is coupled to the main circuit board 310. It will be appreciated that, an antenna 312 of the electronic device 1000 is located within the antenna area 314.

The flexible printed circuit board 20(220) does not overlap the antenna area 314, i.e., the flexible printed circuit board 20(220) does not cover the antenna 312 in the antenna area 314, such that the antenna 312 can normally receive and transmit signals so as to enable the electronic device 1000 to normally communicate. As illustrated in FIG. 5, the antenna 312 is interrupted at the position of the projection portion 22(221), such that the flexible printed circuit board 20(220) does not cover the antenna 312.

In one implementation, the main circuit board 310 is located between the first projection sub-portion 222a and the second projection sub-portion 222b so as to render the structure of the electronic device 1000 more compact.

In one implementation, the two cameras of the imaging module 100(200) are front cameras. In other words, the two cameras 10(210) have a shooting orientation identical to the displaying orientation of the display 1100 of the electronic device 1000, such that the two cameras 10(210) face the user when the user uses the electronic device 1000 normally. The front two cameras 10(210) can improve the quality of the images when the user uses the electronic device 1000 to take a photograph of himself/herself, thereby improving user experience.

In other implementations, the two cameras of the imaging module 100(200) may also be rear cameras.

It is to be noted that, aspects of the imaging module 200 which are not described may be identical or similar to those of the aforementioned imaging module 100 or 200, and are not repeated herein.

As explained above, according to the imaging module 100(200) and the electronic device 1000 of the present disclosure, since the ratio of the width W of the projection portion 22 to the length L of the side edge ranges from ⅓ to ⅔, the area covered by the flexible printed circuit board 20 is small, thereby facilitating the arrangement of the electronic elements of the electronic device.

In the present disclosure, the description of the terms "one implementation", "exemplary implementation", "example", "embodiment", "some examples", or the like are intended to mean that specific features, structures, materials, or characteristics described in conjunction with the implementations or examples are included in at least one implementation or example of the present disclosure. In the specification, the exemplary description of the foregoing terms does not necessarily refer to the same implementations or examples. Moreover, the described specific features, structures, materials, or characteristics may be combined in an appropriate way in any one or more implementations or examples.

Although the implementations of the present disclosure have been illustrated and described, it should be understood by persons skilled in the art that various changes, modifications, substitutions, and variations could be made to these implementations without departing from the principles and spirits of the present disclosure. The scope of the present disclosure is defined by claims and equivalents thereof.

What is claimed is:

1. An imaging module, comprising:
   a flexible printed circuit board; and
   an imaging unit comprising a first camera and a second camera arranged side by side and connected to the flexible printed circuit board, wherein
   the flexible printed circuit board comprises a projection portion projecting to a side edge of the imaging unit, the side edge extends along an arranging direction of the first and second cameras, and a width of the projection portion in the arranging direction is less than a length of the side edge;
   each of the first and second cameras comprises a printed circuit board, and the flexible printed circuit board is coupled to the two printed circuit boards;
   the flexible printed circuit board further comprises:
   a first connection portion coupled to the printed circuit board of the first camera and a second connection portion coupled to the printed circuit board of the second camera; and
   an extension portion extending from the second connection portion towards the first connection portion and covering the first connection portion;
   the projection portion comprises a first projection sub-portion projecting from the first connection portion and beyond the side edge and a second projection sub-portion projecting from the extension portion and beyond the side edge, wherein the first projection sub-portion and the second projection sub-portion are arranged to be stacked.

2. The imaging module of claim 1, wherein a ratio of the width of the projection portion to the length of the side edge of the imaging unit ranges from ⅓ to ⅔.

3. The imaging module of claim 2, wherein the ratio of the width of the projection portion to the length of the side edge of the imaging unit ranges from ⅓ to ½.

4. The imaging module of claim 1, wherein the length of the side edge of the imaging unit is 8 to 12 mm, and the width of the projection portion is 4 to 6 mm.

5. The imaging module of claim 1, wherein the projection portion is located at one side of the first camera.

6. The imaging module of claim 5, wherein the width of the projection portion is no greater than a length of the first camera in the arranging direction.

7. The imaging module of claim 5, wherein each of the first and second cameras further comprise an image sensor disposed on the printed circuit board, and a lens assembly located above the image sensor, wherein the two printed circuit boards are spaced apart.

8. The imaging module of claim 1, wherein the first projection sub-portion comprises:
   a first projection section projecting to the first camera; and
   a second projection section, connected to one end of the first projection section away from the first camera and projecting along the arranging direction.

9. The imaging module of claim 1, wherein the imaging module further comprises a first connector and a second connector, the first connector being provided on a first surface of the first projection sub-portion, the second connector being provided on a second surface of the second projection sub-portion, and the second surface is opposite the first surface.

10. The imaging module of claim 5, wherein each of the first and second cameras comprises an image sensor and a lens assembly located above the image sensor, wherein the two image sensors are disposed on one printed circuit board, and the flexible printed circuit board is a single continuous flexible printed circuit board coupled to the printed circuit board.

11. The imaging module of claim 10, wherein the projection portion comprises a first elongation portion coupled to the printed circuit board and a second elongation portion elongating along the arranging direction from one end of the first elongation portion away from the printed circuit board.

12. An electronic device, comprising:
    a main circuit board; and
    an imaging module comprising:
    a flexible printed circuit board coupled to the main circuit board; and
    an imaging unit comprising a first camera and a second camera arranged side by side and connected to the flexible printed circuit board, wherein
    the flexible printed circuit board comprises a projection portion projecting to a side edge of the imaging unit, the side edge extends along an arranging direction of the two cameras, and a width of the projection portion in the arranging direction is less than a length of the side edge;
    each of the first and second cameras comprises a printed circuit board, and the flexible printed circuit board is coupled to the two printed circuit boards;
    the flexible printed circuit board further comprises:
    a first connection portion coupled to the printed circuit board of the first camera and a second connection portion coupled to the printed circuit board of the second camera; and
    an extension portion extending from the second connection portion towards the first connection portion and covering the first connection portion;
    the projection portion comprises a first projection sub-portion projecting from the first connection portion and beyond the side edge and a second projection sub-portion projecting from the extension portion and beyond the side edge, wherein the first projection sub-portion and the second projection sub-portion are arranged to be stacked, and the main circuit board is located between the first projection sub-portion and the second projection sub-portion.

13. The electronic device of claim 12, wherein a ratio of the width of the projection portion to the length of the side edge of the imaging unit ranges from 1/3 to 2/3.

14. The electronic device of claim 12, wherein the projection portion is located at one side of the first camera.

15. The electronic device of claim 14, wherein each of the first and second cameras further comprises an image sensor disposed on the printed circuit board, and a lens assembly located above the image sensor, wherein the two printed circuit boards are spaced apart.

16. The electronic device of claim 14, wherein each of the first and second cameras comprises an image sensor and a lens assembly located above the image sensor, wherein the two image sensors are disposed on one printed circuit board, and the flexible printed circuit board is a single continuous flexible printed circuit board coupled to the printed circuit board.

17. An imaging module, comprising:
a flexible printed circuit board; and
an imaging unit comprising a first camera and a second camera arranged side by side and connected to the flexible printed circuit board, wherein
the flexible printed circuit board comprises a projection portion projecting to a side edge of the imaging unit, the side edge extends along an arranging direction of the first and second cameras;
the flexible printed circuit board further comprises:
a first connection portion coupled to the first camera and a second connection portion coupled to the second camera; and
an extension portion extending from the second connection portion towards the first connection portion and covering the first connection portion;
the projection portion comprises a first projection sub-portion projecting from the first connection portion and beyond the side edge and a second projection sub-portion projecting from the extension portion and beyond the side edge, wherein the first projection sub-portion and the second projection sub-portion are arranged to be stacked.

18. The imaging module of claim 17, wherein a width of the projection portion in the arranging direction is less than a length of the side edge.

19. The imaging module of claim 18, wherein each of the first and second cameras comprises a printed circuit board, an image sensor disposed on the printed circuit board, and a lens assembly located above the image sensor, wherein the two printed circuit boards are spaced apart, and the flexible printed circuit board is coupled to the two printed circuit boards.

20. The imaging module of claim 19, wherein the imaging module further comprises a first connector and a second connector, the first connector being provided on a first surface of the first projection sub-portion, the second connector being provided on a second surface of the second projection sub-portion, and the second surface is opposite the first surface.

* * * * *